US006417518B2

(12) United States Patent
Arakawa et al.

(10) Patent No.: US 6,417,518 B2
(45) Date of Patent: Jul. 9, 2002

(54) RADIATION IMAGE INFORMATION READ-OUT METHOD AND SYSTEM

(75) Inventors: Satoshi Arakawa; Hiroyuki Karasawa; Hiroaki Yasuda, all of Kanagawa-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/770,187

(22) Filed: Jan. 29, 2001

Related U.S. Application Data

(62) Division of application No. 09/120,304, filed on Jul. 22, 1998.

(30) Foreign Application Priority Data

Jul. 22, 1997 (JP) .............................. 9-195311
Aug. 25, 1997 (JP) .............................. 9-228158

(51) Int. Cl.[7] .............................................. G03B 42/08
(52) U.S. Cl. ................................................ 250/587
(58) Field of Search ............................... 250/587, 586, 250/584, 582, 581, 585

(56) References Cited

U.S. PATENT DOCUMENTS

| | | | |
|---|---|---|---|
| 4,410,799 A | 10/1983 | Okamoto | 250/586 |
| 4,498,006 A | 2/1985 | Horikawa et al. | 250/327.2 |
| 4,699,470 A | 10/1987 | McLaughlin et al. | 358/466 |
| 4,757,199 A * | 7/1988 | Horikawa | 250/587 |
| 4,914,294 A * | 4/1990 | Fukai et al. | 250/585 |
| 5,335,172 A * | 8/1994 | Matsumoto et al. | 250/582 |
| 5,461,238 A | 10/1995 | Hara et al. | 250/587 |

FOREIGN PATENT DOCUMENTS

| | | | |
|---|---|---|---|
| JP | 55-12429 | 1/1980 | |
| JP | 56-11395 | 2/1981 | |
| JP | 56-11397 | 2/1981 | |
| JP | 58-67241 | 4/1983 | |
| JP | 58-67243 | 4/1983 | |
| JP | 58-83937 | 5/1983 | |
| JP | 62-133442 * | 6/1987 | G03B/42/02 |
| JP | 2-15154 | 4/1990 | |
| JP | 4-1745 | 1/1992 | |

* cited by examiner

Primary Examiner—Constantine Hannaher
Assistant Examiner—Albert Gagliardi
(74) Attorney, Agent, or Firm—Sughrue Mion, PLLC (57) ABSTRACT

An image signal representing radiation image information on an object stored on a stimulable phosphor sheet is read out by scanning the stimulable phosphor sheet with a stimulating light beam and photoelectrically detecting light emitted from the stimulable phosphor sheet upon stimulation thereof by a photodetector having a photoelectric surface. A variable transmittance medium whose transmittance to the light emitted from the stimulable phosphor sheet upon stimulation thereof is variable continuously or stepwise is inserted into the optical path of the light between the stimulable phosphor sheet and the photoelectric surface of the photodetector. The transmittance of the variable transmittance medium is changed according to the amount of light emitted from the stimulable phosphor sheet upon stimulation thereof so that the photoelectric surface is not saturated by an excessive amount of light impinging thereupon.

12 Claims, 6 Drawing Sheets

RADIATION IMAGE INFORMATION READ-OUT METHOD AND SYSTEM

This is a divisional of application Ser. No. 09/120,304 filed Jul. 22, 1998, the disclosure of which is incorporated herein by reference.

BACKGROUND OF THE INVENTION

1. Field of the Invention

This invention relates to a method of and a system for reading out radiation image information stored on a stimulable phosphor sheet in which the stimulable phosphor sheet is exposed to stimulating rays, thereby causing it to emit light in proportion to the amount of energy stored thereon during its exposure to the radiation and the light emitted by the stimulable phosphor sheet upon stimulation thereof is photoelectrically detected and converted into an electric image signal representing the radiation image information, and more particularly to an improvement for preventing saturation of a photodetector having a photoelectric surface.

2. Description of the Related Art

When certain kinds of phosphors are exposed to radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor". It has been known to use stimulable phosphors in radiation image recording and reproducing systems (sometimes referred to as "computed radiography"). Specifically, a radiation image of an object, such as a human body, is recorded on a stimulable phosphor sheet (a recording medium provided with a layer of the stimulable phosphor). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is used for reproducing the radiation image of the object as a visible image on a recording medium such as a photosensitive material or a display such as a CRT. See Japanese Unexamined Patent Publication Nos. 55(1980)-12429, 56(1981)-11395, 56(1981)-11397 and the like.

The radiation image recording and reproducing system is practically advantageous in that as compared with conventional radiographies using silver halide film, an image can be recorded over an extremely wide radiation exposure range.

When reading out radiation image information from the stimulable phosphor sheet in the radiation image recording and reproducing system, for instance, a light beam such as a laser beam is caused to two-dimensionally scan the stimulable phosphor sheet storing thereon a radiation image, and the light emitted from the stimulable phosphor sheet upon stimulation thereof is transmitted to a photodetector through an optical guide having a light inlet end face extending along the main scanning line. The photodetector photoelectrically detects in time the light emitted from the stimulable phosphor sheet upon stimulation thereof and an image signal made up of image signal components for respective picture elements is obtained.

The photodetectors generally employed in such systems include those utilizing an internal photoelectric effect, e.g., a phototransistor, a photodiode and the like, and those having a photoelectric surface and utilizing a photoemissive effect on the photoelectric surface, e.g., a photomultiplier. When those having a photoelectric surface such as a photomultiplier are employed in the above system, the following provision is generally made in order to improve sensitivity of the photodetector.

That is, the photodetector of this type is generally provided with an optical guide for collecting the light, emitted from the stimulable phosphor sheet upon stimulation thereof, to the photoelectric surface. The provision involves increasing light collecting efficiency to the photoelectric surface by improving the light collecting performance of the optical guide and/or employment of a photoelectric surface made of a material such as bialkali, e.g., Sb-K-Cs, which is high in quantum efficiency.

However, increasing the sensitivity of a photodetector with a photoelectric surface gives rise to another problem that a saturation phenomenon, that the sensitivity of the photodetector deteriorates for a while after detection of a large amount of light, is apt to occur at the photoelectric surface and when a visible image is reproduced on the basis of an image signal obtained from a saturated photodetector, a ghost image appears and the image quality deteriorates.

The system may be employed in general industrial field as well as a medical field. In the medical field, the object is the human body and since the irradiation dose does not greatly vary depending on the part whose radiation image is to be taken, the amount of light emitted from the stimulable phosphor sheet upon stimulation thereof does not greatly fluctuate.

To the contrast, in the general industrial field, where the system is used in non-destructive inspection of products such as a cast iron block, an iron block and the like, various kinds of materials can be the object.

Accordingly, in order to obtain radiation image information suitable for the respective kinds of materials, the irradiation dose varies depending on the kind of the object over a very wide range (two to three figures in terms of dose ratio).

Thus in the radiation image recording and reproducing system for use in the general industrial field, the aforesaid saturation phenomenon is apt to occur, and accordingly, there has been a demand for a radiation image information read-out system in which the saturation phenomenon at the photodetector is suppressed with the sensitivity of the photodetector kept high.

The intensity of light emitted from the stimulable phosphor sheet upon stimulation thereof rapidly increases from initiation of exposure to the stimulating light and is maximized in a short time (e.g., in several ns) and then is gradually weakened, with the stimulable phosphor sheet keeping emitting light for a time unique to the phosphors on the stimulable phosphor sheet after termination of exposure to the stimulating light. The light emitted from the stimulable phosphor sheet after termination of exposure to the stimulating light is generally referred to as "afterglow". Accordingly when the stimulable phosphor sheet is scanned by the stimulating light and the light emitted from the stimulable phosphor sheet is photoelectrically read out in time series, the afterglow component of picture elements precedingly exposed to the stimulating light is read in addition to the light emitted from a given picture element upon stimulation thereof as the radiation image information component for the picture element, which results in incomplete separation of image signal components for the picture elements and deterioration in sharpness of the reproduced image. Accordingly, when the stimulable phosphors on the stimulable phosphor sheet exhibit long afterglow, the sharpness of the image deteriorates to an unacceptable level.

Such a phenomenon occurs substantially in proportion to the irradiation dose (radiation energy) of the stimulating light per unit area of the stimulable phosphor sheet. Accordingly, for example, when a picture element where the amount of light emitted upon stimulation is relatively small exists just behind a picture element where the amount of light emitted upon stimulation is relatively large, the afterglow component from the large emission picture element is superposed on the light emitted from the small emission picture element upon stimulation thereof, and the amount of light read out as that emitted from the small emission picture element is increased by the amount of the afterglow. This reduces the difference between the image signal components for the large emission picture element and the small emission picture element as compared with the actual difference therebetween, and accordingly the reproduced image deteriorates in contrast, i.e., the S/N ratio of the image signal deteriorates.

In order to overcome this problem, there has been proposed a method in which interference between image signal components for the respective picture elements due to response properties (e.g., attenuation properties) of the light emitted from the picture elements upon stimulation thereof is electrically corrected by adding, to each of the image signal components in time series obtained by scanning the stimulable phosphor sheet with the stimulating light, a differential value of the image signal component. (See Japanese Patent Publication No. 2(1990)-15154.)

However this approach is disadvantageous in the following points. First this approach involves a large amount of calculation since interference between image signal components for the respective picture elements is corrected by calculation taking into account the response properties (e.g., attenuation properties) of the light emitted from the picture elements upon stimulation thereof. Second though being able to avoid deterioration in sharpness and/or contrast of the radiation image, the approach cannot overcome the problem of deterioration in S/N ratio.

SUMMARY OF THE INVENTION

In view of the foregoing observations and description, a first object of the present invention is to provide a radiation image information read-out system and method in which the saturation phenomenon at the photodetector is suppressed, thereby preventing appearance of a ghost image, with the sensitivity of the photodetector kept high.

A second object of the present invention is to provide a radiation image information read-out system and method in which said problems caused by the afterglow inclusive of deterioration in S/N ratio can be overcome in a simple manner and the radiation image information can be accurately read out at a high speed even if the scanning speed is increased.

The first object of the present invention can be accomplished by a radiation image information read-out method and a radiation image information read-out system in which the absolute value of the amount of light impinging upon the photoelectric surface of the photodetector is suppressed by causing the light emitted from the stimulable phosphor sheet upon stimulation thereof to pass through a variable transmittance medium whose transmittance is varied according to the amount of light emitted from the stimulable phosphor sheet before impinging upon the photoelectric surface or by changing the amount of stimulating light according to the amount of light emitted from the stimulable phosphor sheet upon stimulation thereof.

That is, in accordance with a first aspect of the present invention, there is provided a radiation image information read-out method for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises the steps of inserting a variable transmittance medium whose transmittance to the light emitted from the stimulable phosphor sheet upon stimulation thereof is variable continuously or stepwise into the optical path of the light between the stimulable phosphor sheet and the photoelectric surface of the photodetector, and changing the transmittance of the variable transmittance medium according to the amount of light emitted from the stimulable phosphor sheet upon stimulation thereof so that the photoelectric surface is not saturated by an excessive amount of light impinging thereupon.

The stimulating light beam may be visible light, a laser beam or the like.

As the variable transmittance medium, an electrochromic element whose transmittance to light varies according to the direction of current, a NCAP type liquid crystal element or the like can be employed as those whose transmittance can be electrically changed. Further a ND filter system in which a plurality of optical elements which are different in transmittance are mechanically selectively inserted into said optical path can also be employed.

As a material for electrochromic element, amorphous $WO_3$ (colorless to blue), $IrO_2$ (colorless to blue), viologen (colorless to blue), anthraquinone (colorless to red) or the like may be used, and may be selected according to the color of light emitted from the stimulable phosphor sheet.

The NCAP (Nematic Curvilinear Aligned Phase) type liquid crystal element is of encapsulated nematic liquid crystals. Generally the liquid crystal has a rod-like molecule exhibiting electrooptic anisotropy. The molecules are apt to orient along an oriented film, and in a normal state where no electric field is applied to the liquid crystal element, the molecules orient inward of the capsules and incident light is scattered at the surface and inside of the liquid crystals depending on the refractive properties of the crystals, whereby the liquid crystal element becomes opaque. When an electric field is applied to the liquid crystal element, the liquid crystals which are positive in dielectric anisotropy orient in the direction perpendicular to the surface of the electrodes. When the liquid crystals are of the same refractive index as the polymer which is outside the capsules and in which the liquid crystals are dispersed, light travels straight without being scattered and accordingly the liquid crystal element becomes transparent.

The variable transmittance medium may be disposed at the light inlet end face of the optical guide or at the connection between the optical guide and the photodetector when the optical guide is integrated with the photodetector. Though not necessary, it is preferred that the optical guide be integrated with the photodetector from the viewpoint of simplicity of handling. In the case of a ND filter system, the filter must be moved to adjust the transmittance and accordingly it is not preferred that the ND filter system is integrated with the photodetector or the like to such an extent that the ND filter cannot make a relative movement.

The degree by which the transmittance of the variable transmittance medium is to be changed according to the amount of light emitted from the stimulable phosphor sheet upon stimulation thereof may be empirically determined and may be tabulated with respect to the amount of light so that the degree by which the transmittance of the variable transmittance medium is to be changed can be known by referring to the table.

The amount of light emitted from the stimulable phosphor sheet upon stimulation thereof may be determined by actually exposing a part of stimulable phosphor sheet, which is limited not to affect reproduction of the radiation image, to the stimulating light and detecting the amount of light emitted from the part or may be determined by estimation based on the irradiation dose to which the stimulable phosphor sheet was exposed to the radiation upon taking the radiation image and the energy of the stimulating light. such estimation may be input from the outside. In the case of the radiation image recording and reproducing system for industrial use, the kinds of objects are larger than in the case of that for medical use. Accordingly, the radiographing menu such as the material and the thickness of the object, the radiographing direction and the like is closely related to the irradiation dose and on the basis of this fact, the amount of light emitted from the stimulable phosphor sheet upon stimulation thereof may be determined according to the radiographing menu.

Also in the case where the amount of light emitted from the stimulable phosphor sheet upon stimulation thereof is determined according to the radiographing menu, the degree by which the transmittance of the variable transmittance medium is to be changed may be empirically determined and may be tabulated in relation to the radiographing menu so that the degree by which the transmittance of the variable transmittance medium is to be changed can be known by referring to the table on the basis of the menu.

The above description may also be applied to the followings inventions.

In accordance with a second aspect of the present invention, there is provided a radiation image information read-out system for carrying out the method in accordance with the first aspect of the present invention. That is, in accordance with the second aspect of the present invention, there is provided a radiation image information read-out system for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises a variable transmittance medium which is variable continuously or stepwise in transmittance to the light emitted from the stimulable phosphor sheet upon stimulation thereof and is inserted into the optical path of the light between the stimulable phosphor sheet and the photoelectric surface of the photodetector, and a transmittance changing means which changes the transmittance of the variable transmittance medium according to the amount of light emitted from the stimulable phosphor sheet upon stimulation thereof so that the photoelectric surface is not saturated by an excessive amount of light impinging thereupon.

In accordance with a third aspect of the present invention, there is provided a radiation image information read-out method for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises the step of changing the amount of the stimulating light impinging upon the stimulable phosphor sheet continuously or stepwise according to the amount of light emitted from the stimulable phosphor sheet upon stimulation thereof so that the photoelectric surface is not saturated by an excessive amount of light impinging thereupon.

The amount of the stimulating light impinging upon the stimulable phosphor sheet may be changed by directly controlling the source of the stimulating light to change the amount of stimulating light emitted from the source, or by inserting a variable transmittance medium whose transmittance to the stimulating light is variable continuously or stepwise into the optical path of the stimulating light from the stimulating light source to the stimulable phosphor sheet and changing the transmittance of the variable transmittance medium with the amount of stimulating light emitted from the source unchanged. The variable transmittance medium may be an electrochromic element, a NCAP type liquid crystal element, a ND filter system or the like. When the amount of the stimulating light impinging upon the stimulable phosphor sheet is changed, the levels of the signal representing detection of the leading end of the sheet (in the sub-scanning direction) and the signal representing detection of the scanning starting point (in the main scanning direction) are changed. Accordingly it is preferred that the gains of such signals be automatically adjusted.

The above description may also be applied to the followings inventions.

In accordance with a fourth aspect of the present invention, there is provided a radiation image information read-out system for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises a means for changing the amount of the stimulating light impinging upon the stimulable phosphor sheet continuously or stepwise according to the amount of light emitted from the stimulable phosphor sheet upon stimulation thereof so that the photoelectric surface is not saturated by an excessive amount of light impinging thereupon.

In the radiation image information read-out method and system of the first and second aspects of the present invention, the level of the amount of light impinging upon the photoelectric surface of the photodetector is suppressed not to saturate the photoelectric surface by changing the transmittance of the variable transmittance medium disposed in the optical path of the light emitted from the stimulable phosphor sheet upon stimulation thereof between the stimulable phosphor sheet and the photoelectric surface according to an estimated or measured amount of the light emitted from the stimulable phosphor sheet upon stimulation thereof.

For example, when the amount of light is large, the transmittance of the variable transmittance medium is reduced so that a smaller part of the light emitted from the stimulable phosphor sheet can reach the photoelectric surface, whereby generation of image signal components which can produce a ghost image due to saturation of the photoelectric surface can be suppressed.

On the other hand, when the amount of light is small, the transmittance of the variable transmittance medium is kept high so that an image signal can be obtained at a high sensitivity and deterioration in S/N ratio can be suppressed. In this case, since the amount of light emitted from the stimulable phosphor sheet upon stimulation thereof is originally small, there is no fear that the photoelectric surface is saturated.

In the radiation image information read-out method and system of the third and fourth aspects of the present invention, the level of the amount of light impinging upon the photoelectric surface of the photodetector is suppressed not to saturate the photoelectric surface by changing the amount of stimulating light impinging upon the stimulable phosphor sheet according to an estimated or measured amount of the light emitted from the stimulable phosphor sheet upon stimulation thereof.

For example, when the amount of light expected to be emitted from the stimulable phosphor sheet upon stimulation thereof is large, the amount of stimulating light impinging upon the stimulable phosphor sheet is reduced so that a smaller amount of light is emitted from the stimulable phosphor sheet, whereby the level of the amount of light impinging upon the photoelectric surface of the photodetector is suppressed and generation of image signal components which can produce a ghost image due to saturation of the photoelectric surface can be suppressed.

On the other hand, when the amount of light expected to be emitted from the stimulable phosphor sheet upon stimulation thereof is small, the amount of stimulating light is not reduced (if possible, may be increased, for instance, by controlling the stimulating light source) and accordingly, the amount of light emitted from the stimulable phosphor sheet is not reduced, whereby an image signal can be obtained at a high sensitivity and deterioration in S/N ratio can be suppressed. In this case, since the amount of light emitted from the stimulable phosphor sheet upon stimulation thereof is originally small, there is no fear that the photoelectric surface is saturated.

In the radiation image information read-out methods and systems of first to fourth aspects of the present invention, when the amount of light emitted from the stimulable phosphor sheet upon stimulation thereof is estimated on the basis of the radiographing menu, necessity of actually detecting the amount of light is eliminated and algorithm for the system can be simplified.

In accordance with a fifth aspect of the present invention, there is provided a radiation image information read-out method for obtaining an image signal representing radiation image information on an object stored on a stimulable phosphor sheet by exposing the stimulable phosphor sheet to stimulating light and photoelectrically detecting light emitted from the stimulable phosphor sheet upon stimulation thereof by a photodetector, wherein the improvement comprises the step of setting the sensitivity of the photodetector so that the amount of light emitted from a blank portion on the stimulable phosphor sheet bearing thereon no radiation image information of the object becomes larger than that corresponding to the upper limit of the operable range of the photodetector, and controlling the irradiation energy of the stimulating light so that the level of a signal component obtained by the photodetector by reading the light emitted from the blank portion is minimized in the range higher than the upper limit of the read-out signal level range corresponding to the operable range of the photodetector.

The "blank portion" on the stimulable phosphor sheet bearing thereon no radiation image information of the object is a portion which, when the radiation image was recorded, was directly exposed to the radiation without passing through the object. Further "the operable range of the photodetector" is a range of the amount of light in which the photodetector can correctly convert the amount of light into an electric signal component.

The expression "controlling the irradiation energy of the stimulating light" means to control the effective energy of the stimulating light to which the stimulable phosphor sheet is exposed per unit area thereof. The irradiation energy of the stimulating light can be controlled, for instance, by attenuating the stimulating light from the stimulating light source such as a laser by an acoustooptic modulator or the like provided on the optical path of the stimulating light, or by, in the case where the stimulating light source is a semiconductor laser, controlling the input voltage to the semiconductor laser, or by increasing the scanning speed of the stimulating light beam.

In the radiation image information read-out method of the fifth aspect, it is preferred that "preliminary read-out" be effected prior to "final read-out" and the sensitivity of the photodetector be set on the basis of the image information obtained by the preliminary read-out.

As disclosed, for instance, in Japanese Unexamined Patent Publication Nos. 58(1983)-67241, 58(1983)-67243 and 58(1983)-83937, the "preliminary read-out" is a well-known technique in which brief of the radiation image information stored on a stimulable phosphor sheet is read out prior to the "final read-out" by exposing the stimulable phosphor sheet to stimulating light having a lower level than that used in the final read-out and reading out light emitted from the stimulable phosphor sheet upon stimulation by the lower level stimulating light.

A plurality of levels of the sensitivity of the photodetector may be registered in advance in relation to different radiographing menus and the sensitivity of the photodetector may be set to the sensitivity level corresponding to the radiographing menu for the radiation image information to be read out.

The "radiographing menu" means the part of the object, the method of radiographing and the like and includes, for instance, chest radiographing, head radiographing, angiography and the like.

In accordance with a sixth aspect of the present invention, there is provided a radiation image information read-out system for obtaining an image signal representing radiation image information on an object stored on a stimulable phosphor sheet comprising a stimulating light projecting means which exposes the stimulable phosphor sheet to stimulating light thereby causing the stimulable phosphor sheet to emit light in proportion to the amount of energy stored thereon and a photodetector which detects the light emitted from the stimulable phosphor sheet upon stimulation thereof, wherein the improvement comprises a sensitivity setting means which sets the sensitivity of the photodetector so that the amount of light emitted from a blank portion on the stimulable phosphor sheet bearing thereon no radiation image information of the object becomes larger than that corresponding to the upper limit of the operable range of the photodetector, and a stimulating energy control means which controls the irradiation energy of the stimulating light so that the level of a signal component obtained by the photodetector by reading the light emitted from the blank portion is minimized in the range higher than the upper limit of the read-out signal level range corresponding to the operable range of the photodetector.

It is preferred that the radiation image information read-out system of the sixth aspect be provided with a preliminary read-out means which effects preliminary read-out prior to final read-out of the radiation image information and the sensitivity setting means sets the sensitivity of the photodetector on the basis of the image information obtained by the preliminary read-out.

Further it is preferred that the radiation image information read-out system of the sixth aspect be provided with a means for registering a plurality of levels of the sensitivity of the photodetector in relation to different radiographing menus and the sensitivity setting means sets the sensitivity of the photodetector to the sensitivity level corresponding to the radiographing menu for the radiation image information to be read out.

In the radiation image information read-out method and system of the fifth and sixth embodiments of the present invention, since the sensitivity of the photodetector is set in the aforesaid manner and the irradiation energy of the stimulating light is controlled in the aforesaid manner, the afterglow component of the light emitted from the blank portion is reduced with the light emitted from the portion other than the blank portion kept at the normal level. Since the afterglow component itself is reduced, noise due to the afterglow component can be reduced and the S/N ratio of the read-out signal can be improved. Further since the light emitted from the portion other than the blank portion is kept at the normal level, the image information for the object necessary for diagnosis can be obtained at a proper quality.

When the preliminary read-out is effected prior to the final read-out and the sensitivity of the photodetector is set on the basis of the image information obtained by the preliminary read-out, setting of read-out condition is facilitated. Further when the sensitivity of the photodetector is set on the basis of the radiographing menu, setting of read-out condition is also facilitated.

DESCRIPTION OF THE PREFERRED EMBODIMENTS

Figure 1:
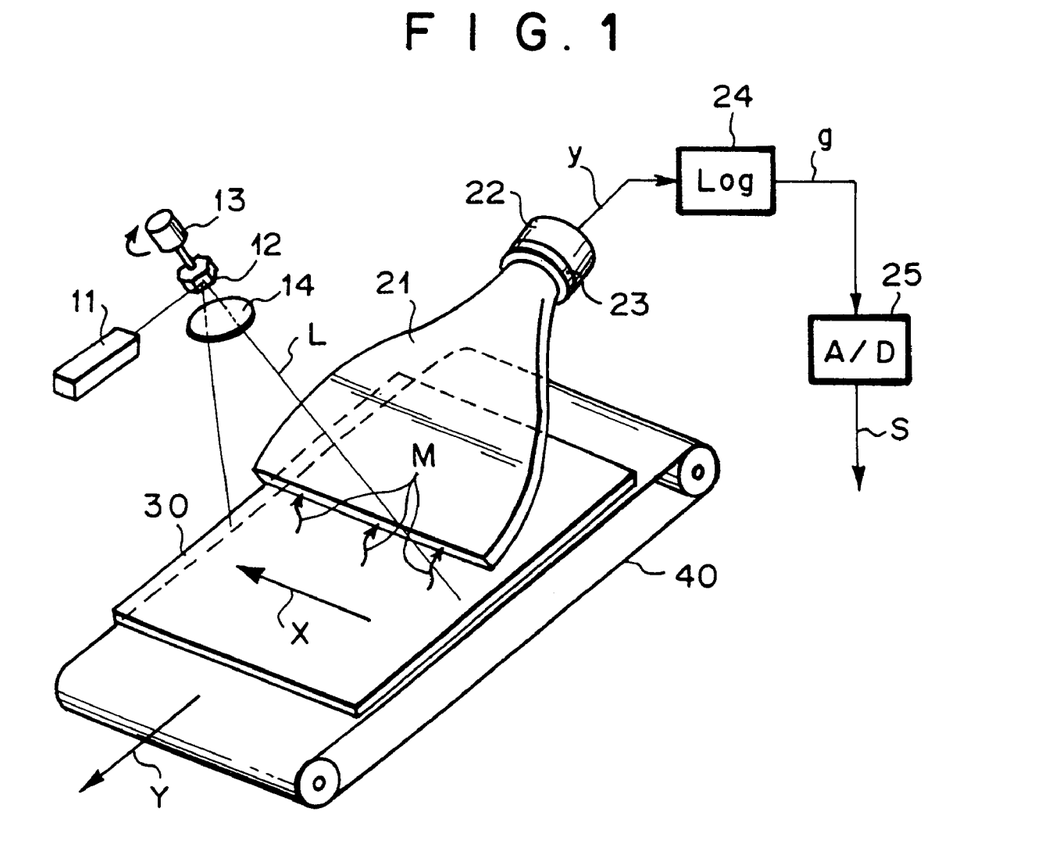
FIG. 1 is a schematic view for illustrating the basic arrangement of a radiation image information read-out system.

In FIG. 1, a radiation image information read-out system to which the present invention is to be applied comprises an endless belt 40 which is driven by an electric motor (not shown) to convey a stimulable phosphor sheet 30 placed thereon in the direction of arrow Y (the sub-scanning direction), a laser 11 which is located above the stimulable phosphor sheet 30 and emits a stimulating laser beam L for stimulating the stimulable phosphor sheet, a rotating polygonal mirror 12 which deflects the laser beam L, an electric motor 13 for rotating the polygonal mirror 12 and a scanning lens (fθ lens) 14 which focuses the laser beam L, deflected by the polygonal mirror 12, on the stimulable phosphor sheet 30 and causes it to scan the stimulable phosphor sheet 30 at a constant speed.

An optical guide 21 is located above the stimulable phosphor sheet 30 close to the scanning line of the laser beam L to collect light M emitted from the upper surface of the stimulable phosphor sheet 30 upon stimulation thereof by the laser beam L. A photomultiplier 22 is connected to the optical guide 21 by way of a stimulating light cut filter 23, which prevents the laser beam L to enter the photomultiplier 22, and photoelectrically converts the collected light M to an analog image signal y.

A logarithmic amplifier 24 is connected to the photomultiplier 22 and outputs a logarithmic image signal g by logarithmic conversion of the analog image signal y. An A/D convertor 25 is connected to the logarithmic amplifier 24 and digitizes the logarithmic image signal g into a digital image signal S. The digital image signal S is output to an external image processing system.

The operation of the radiation image information read-out system shown 1 will be briefly described hereinbelow.

A stimulable phosphor sheet 30 storing thereon radiation image information is set on the endless belt 40 in a predetermined position. Then the stimulable phosphor sheet 30 is conveyed (sub-scanning) in the direction of arrow Y by the endless belt 40.

The laser beam L emitted from the laser 11 is deflected by the polygonal mirror 12 which is rotated at a high speed in the direction of arrow by the motor 13 and is focused on the surface of the stimulable phosphor sheet 30 by the scanning lens 14 and is caused to scan the surface of the stimulable phosphor sheet 30 at a constant speed in the direction of arrow X (main scanning). Thus the stimulable phosphor sheet 30 is exposed to the laser beam L over the entire area thereof.

The portion of the stimulable phosphor sheet 30 exposed to the laser beam L emits light M in proportion to the amount of energy stored thereon.

The light M emitted from the exposed parts of the stimulable phosphor sheet 30 in sequence is guided to the photomultiplier 22 by the optical guide 21. At this time also a part of the laser beam L, e.g., a part of the laser beam L reflected at the stimulable phosphor sheet 30, enters the optical guide 21.

The light M and the laser beam L entering the optical guide 21 impinge upon the stimulating light cut filter 23 between the optical guide 21 and the photomultiplier 22, and the laser beam L is cut by the filter 23 while the light M passes through the filter 23 to impinge upon the photomultiplier 22.

The photomultiplier 22 photoelectrically converts the light M to an analog image signal y corresponding to the amount P of the light M impinging upon the photomultiplier 22 and outputs the analog image signal y to the logarithmic amplifier 24.

The logarithmic amplifier 24 outputs a logarithmic image signal g by logarithmic conversion of the analog image signal y. The logarithmic image signal g is input into the A/D convertor 25 and is sampled at predetermined sampling intervals in synchronization with the scanning by the laser beam L, thereby quantized into a digital image signal S made up of image signal components for the respective picture elements.

A radiation image information read-out system in accordance with a first embodiment will be described with reference to FIG. 2, hereinbelow.

The radiation image information read-out system of this embodiment mainly differs from that shown in FIG. 1 in that an electrochromic element 51 is disposed between the stimulating light cut filter 23 and the photomultiplier 22. The transmittance of the electrochromic element 51 to the light M emitted from the stimulable phosphor sheet 30 upon stimulation thereof can be changed.

As the material for the electrochromic element 51, amorphous $WO_3$ (colorless to blue), $IrO_2$ (colorless to blue), viologen (colorless to blue), anthraquinone (colorless to red) or the like may be used.

The radiation image information read-out system of this embodiment further comprises a light amount determination means 53 which determines the amount of light M which is expected to impinge upon the photomultiplier 22 through estimation on the basis of the radiographing menu for the stimulable phosphor sheet 30 input from the exterior, and a transmittance changing means 52 which changes the transmittance of the electrochromic element 51 on the basis of the amount of light M which is expected to impinge upon the photomultiplier 22 determined by the light amount determination means 53 so that the photoelectric surface of the photomultiplier 22 is not saturated by an excessive amount of light impinging thereupon.

The operation of the radiation image information read-out system of this embodiment will be described hereinbelow.

The radiographing menu for the stimulable phosphor sheet 30 to be read out is first input into the light amount determination means 53. The radiographing menu includes the kind of the object, the material of the object, the shape of the object, the size of the object, the direction of radiographing and the like and the irradiation dose of the radiations to which the object was exposed can be determined according to the radiographing menu. The light amount determination means 53 determines the amount of radiation energy stored on the stimulable phosphor sheet 30 on the basis of the radiographing menu input and calculates the amount of light M expected to be emitted from the stimulable phosphor sheet 30 upon stimulation thereof by the laser beam L on the basis of the amount of radiation energy stored on the stimulable phosphor sheet 30 and the stimulating energy of the laser beam L.

The radiographing menu may be input into the light amount determination means 53 by reading information recorded on the stimulable phosphor sheet 30, e.g., by reading a bar code representing the menu by use of a bar code reader, or by way of information on the radiographing menu of the stimulable phosphor sheet associated with the ID information for the sheet 30 which is read out from a server computer and automatically input into the light amount determination means 53. Otherwise the operator may manually input information on the radiographing menu to the light amount determination means 53.

The amount of light M expected to be emitted from the stimulable phosphor sheet 30 determined by the light amount determination means 53 is input into the transmittance changing means 52 and the transmittance changing means 52 changes the transmittance of the electrochromic element 51 according to the amount of light M expected to be emitted from the stimulable phosphor sheet 30.

That is, when the amount of light M expected to be emitted from the stimulable phosphor sheet 30 is large, the transmittance of the electrochromic element 51 is set low so that the photoelectric surface of the photomultiplier 22 is not saturated by an excessive amount of light passing through the filter 23. On the other hand, when the amount of light M expected to be emitted from the stimulable phosphor sheet 30 is small, the transmittance of the electrochromic element 51 is set high within a limit where the photoelectric surface of the photomultiplier 22 is not saturated.

After thus adjusting the transmittance of the electrochromic element 51, the laser 11 (FIG. 1) is operated. The laser beam L emitted from the laser 11 is deflected by the polygonal mirror 12 which is rotated at a high speed in the direction of arrow by the motor 13 and is focused on the surface of the stimulable phosphor sheet 30 by the scanning lens 14 and is caused to scan the surface of the stimulable phosphor sheet 30 at a constant speed in the direction of arrow X while the stimulable phosphor sheet 30 is conveyed in the direction arrow Y. Thus the stimulable phosphor sheet 30 is exposed to the laser beam L over the entire area thereof.

The portion of the stimulable phosphor sheet 30 exposed to the laser beam L emits light M in proportion to the amount of energy stored thereon. The light M emitted from the exposed parts of the stimulable phosphor sheet 30 enters the optical guide 21 together with a part of the laser beam L.

Since the laser beam L is cut by the stimulating light cut filter 23, only the light M passes through the filter 23. (See FIG. 2) The light M passing through the filter 23 further passes through the electrochromic element 51, whose transmittance has been adjusted according to the amount of light M expected to be emitted from the stimulable phosphor sheet 30 upon stimulation thereof, and impinges upon the photomultiplier 22. That is, when the amount of light M is relatively large, the transmittance of the electrochromic element 51 is reduced and accordingly the amount of light M impinging upon the photomultiplier 22 cannot be so large that the photoelectric surface of the photomultiplier 22 is saturated.

On the other hand, when the amount of light M is small, the transmittance of the electrochromic element 51 is set high. In this case, however, since the amount of light M emitted from the stimulable phosphor sheet upon stimulation thereof is originally small, there is no fear that the photoelectric surface of the photomultiplier 22 is saturated and the radiation image information can be read out at a high sensitivity.

The photomultiplier 22 photoelectrically converts the light M to an analog image signal y and outputs the analog image signal y to the logarithmic amplifier 24.

The logarithmic amplifier 24 outputs a logarithmic image signal g by logarithmic conversion of the analog image signal y. The logarithmic image signal g is input into the A/D convertor 25 and is sampled at predetermined sampling intervals in synchronization with the scanning by the laser beam L, thereby quantized into a digital image signal S made up of image signal components for the respective picture elements.

Thus in the radiation image information read-out system of this embodiment, the phenomenon of saturation of the photoelectric surface can be suppressed and generation of ghost image can be suppressed while ensuring a high sensitivity of the photomultiplier 22.

A radiation image information read-out system in accordance with a second embodiment of the present invention will be described, hereinbelow. The radiation image information read-out system of this embodiment mainly differs from that of the first embodiment in that a ND filter system 54 is used in place of the electrochromic element 51 as the variable transmittance medium, and accordingly the elements analogous to those shown in FIGS. 1 and 2 are given the same reference numerals and will not be described here.

The ND filter system 54 is disposed between the stimulating light cut filter 23 and the photomultiplier 22. The transmittance of the ND filter system 54 to the light M emitted from the stimulable phosphor sheet 30 upon stimulation thereof can be changed continuously or stepwise.

The radiation image information read-out system of this embodiment further comprises a transmittance changing means 55 which changes the transmittance of the ND filter system 54 by moving the system 54 in a direction, shown by the arrow in FIG. 3, perpendicular to the optical path on the basis of the amount of light M expected to be emitted from the stimulable phosphor sheet 30 determined by the light amount determination means 53 so that the. photoelectric surface of the photomultiplier 22 is not saturated by an excessive amount of light impinging thereupon.

The operation of the radiation image information read-out system of this embodiment will be described hereinbelow.

The radiographing menu for the stimulable phosphor sheet 30 to be read out is first input into the light amount determination means 53. The radiographing menu includes the kind of the object, the material of the object, the shape of the object, the size of the object, the direction of radiographing and the like and the irradiation dose of the radiations to which the object was exposed can be determined according to the radiographing menu. The light amount determination means 53 determines the amount of radiation energy stored on the stimulable phosphor sheet 30 on the basis of the radiographing menu input and calculates the amount of light M expected to be emitted from the stimulable phosphor sheet 30 upon stimulation thereof by the laser beam L on the basis of the amount of radiation energy stored on the stimulable phosphor sheet 30 and the stimulating energy of the laser beam L.

The radiographing menu may be input into the light amount determination means 53 in any one of the manners described above.

The amount of light M expected to be emitted from the stimulable phosphor sheet 30 determined by the light amount determination means 53 is input into the transmittance changing means 55 and the transmittance changing means 55 changes the transmittance of the ND filter system 54 by moving it in the direction of the arrow according to the amount of light M expected to be emitted from the stimulable phosphor sheet 30.

That is, when the amount of light M expected to be emitted from the stimulable phosphor sheet 30 is large, the transmittance is set low so that the photoelectric surface of the photomultiplier 22 is not saturated by an excessive amount of light passing through the filter 23. On the other hand, when the amount of light M expected to be emitted from the stimulable phosphor sheet 30 is small, the transmittance is set high within a limit where the photoelectric surface of the photomultiplier 22 is not saturated.

After thus adjusting the transmittance of the ND filter system 54, the laser 11 (FIG. 1) is operated. The laser beam L emitted from the laser 11 is deflected by the polygonal mirror 12 which is rotated at a high speed in the direction of arrow by the motor 13 and is focused on the surface of the stimulable phosphor sheet 30 by the scanning lens 14 and is caused to scan the surface of the stimulable phosphor sheet 30 at a constant speed in the direction of arrow X while the stimulable phosphor sheet 30 is conveyed in the direction arrow Y. Thus the stimulable phosphor sheet 30 is exposed to the laser beam L over the entire area thereof.

The portion of the stimulable phosphor sheet 30 exposed to the laser beam L emits light M in proportion to the amount of energy stored thereon. The light M emitted from the exposed parts of the stimulable phosphor sheet 30 enters the optical guide 21 together with a part of the laser beam L.

Since the laser beam L is cut by the stimulating light cut filter 23, only the light M passes through the filter 23. (See FIG. 3)

The light M passing through the filter 23 further passes through the ND filter system 54, whose transmittance has been adjusted according to the amount of light M expected to be emitted from the stimulable phosphor sheet 30 upon stimulation thereof, and impinges upon the photomultiplier 22. That is, when the amount of light M is relatively large, the transmittance is reduced and accordingly the amount of light M impinging upon the photomultiplier 22 cannot be so large that the photoelectric surface of the photomultiplier 22 is saturated. On the other hand, when the amount of light M is small, the transmittance is set high. In this case, however, since the amount of light M emitted from the stimulable phosphor sheet upon stimulation thereof is originally small, there is no fear that the photoelectric surface of the photomultiplier 22 is saturated and the radiation image information can be read out at a high sensitivity.

The photomultiplier 22 photoelectrically converts the light M to an analog image signal y and outputs the analog image signal y to the logarithmic amplifier 24.

The logarithmic amplifier 24 outputs a logarithmic image signal g by logarithmic conversion of the analog image signal y. The logarithmic image signal g is input into the A/D convertor 25 and is sampled at predetermined sampling intervals in synchronization with the scanning by the laser beam L, thereby quantized into a digital image signal S made up of image signal components for the respective picture elements.

Thus in the radiation image information read-out system of this embodiment, the phenomenon of saturation of the photoelectric surface can be suppressed and generation of ghost image can be suppressed while ensuring a high sensitivity of the photomultiplier 22.

Figure 4:
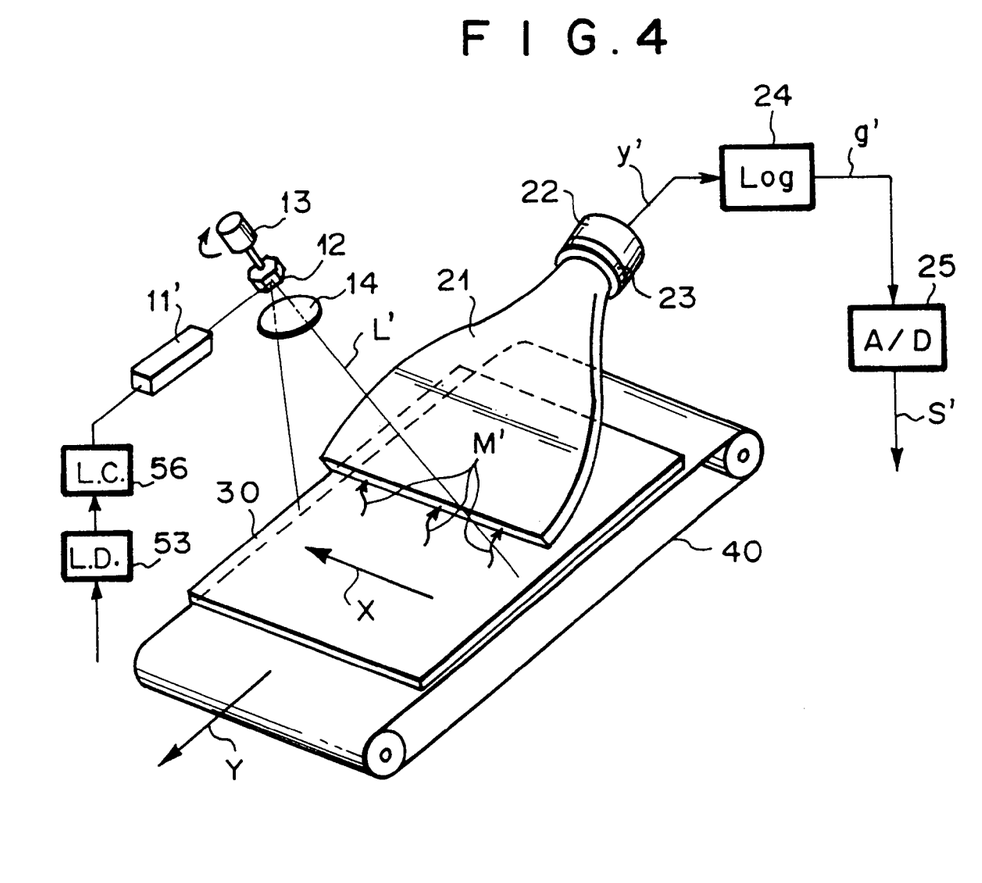
FIG. 4 is a schematic view showing a radiation image information read-out system in accordance with a third embodiment of the present invention.

A radiation image information read-out system in accordance with a third embodiment of the present invention will be described with reference to FIG. 4, hereinbelow.

The radiation image information read-out system of this embodiment mainly differs from that shown in FIG. 1 in that the amount of laser beam L emitted from the laser 11' is variable. That is, the laser 11' is controlled by a light amount determination means 53 which determines the amount of light M expected to be emitted from the stimulable phosphor sheet 30 when the stimulable phosphor sheet 30 is exposed to a given amount of laser beam L and a light amount changing means 56 which controls the laser 11' according to the amount of light M expected to be emitted from the stimulable phosphor sheet 30 determined by the light amount determination means 53 so that the amount of laser beam L emitted from the laser 11' is limited to a level such that the light M emitted from the stimulable phosphor sheet 30 when it is stimulated by the laser beam L cannot saturate the photoelectric surface of the photomultiplier 22.

Figure 2:
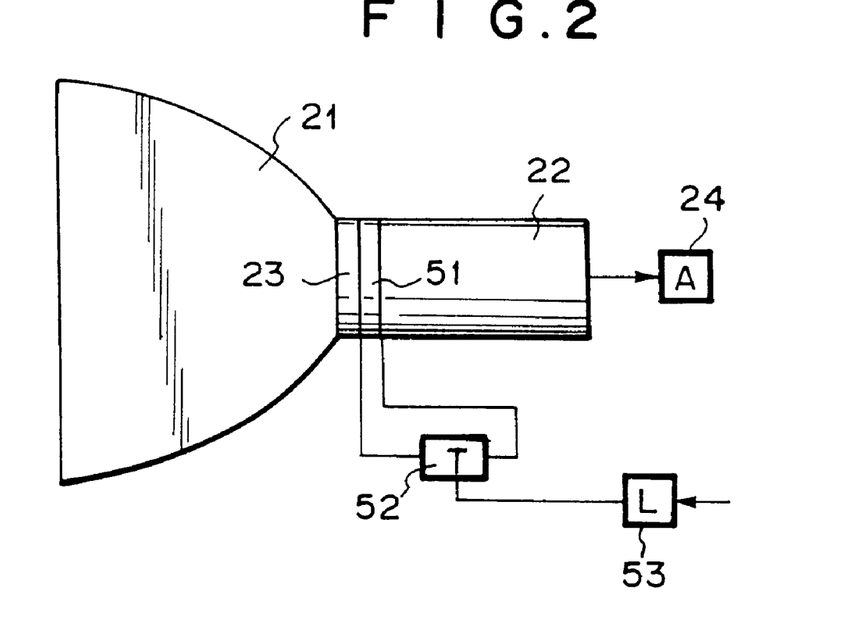
FIG. 2 is a view showing an important part of a radiation image information read-out system in accordance with a first embodiment of the present invention.
Figure 3:
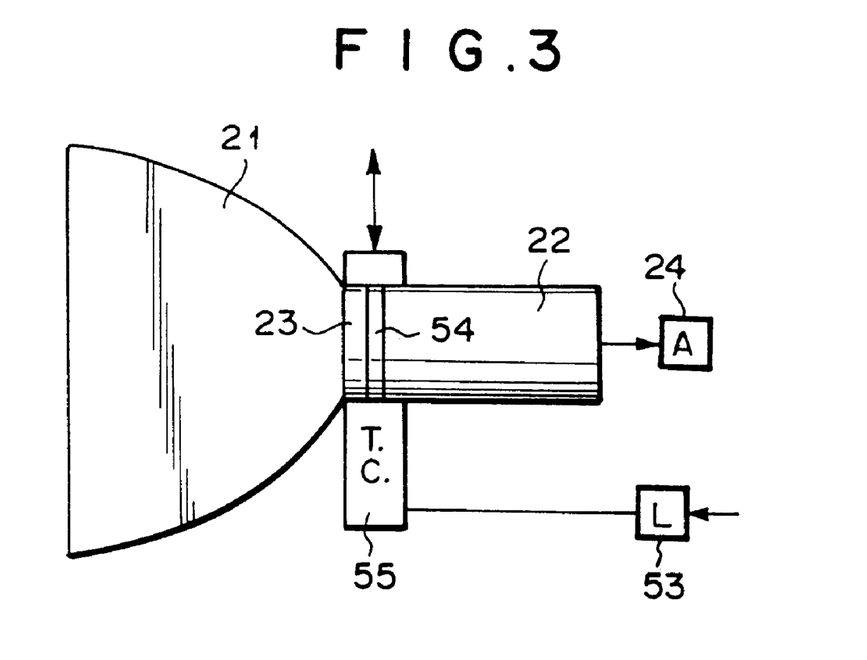
FIG. 3 is a view showing an important part of a radiation image information read-out system in accordance with a second embodiment of the present invention.

The light amount determination means 53 may be the same as that employed in the first embodiment shown in FIG. 2 and accordingly will not be described here.

The operation of the radiation image information read-out system of this embodiment will be described hereinbelow.

The radiographing menu for the stimulable phosphor sheet 30 to be read out is first input into the light amount determination means 53. The light amount determination means 53 calculates the amount of light M expected to be emitted from the stimulable phosphor sheet 30 upon stimulation thereof by the laser beam L on the basis of the radiographing menu and a given amount of the laser beam L. Here it is assumed that the amount of light M expected to be emitted from the stimulable phosphor sheet 30 when stimulated by the given amount of the laser beam L is large enough to saturate the photoelectric surface of the photomultiplier 22.

The amount of light M expected to be emitted from the stimulable phosphor sheet 30 determined by the light amount determination means 53 is input into the light amount changing means 56 and the light amount changing means 56 controls the output of the laser 11' according to the amount of light M expected to be emitted from the stimulable phosphor sheet 30 to reduce the amount of the laser beam L emitted from the laser 11' by a level ΔL. The level ΔL is selected so that the amount of light M' expected to be emitted from the stimulable phosphor sheet 30 when stimulated by the laser beam L' having an amount of light reduced by the ΔL cannot saturate the photoelectric surface of the photomultiplier 22.

After thus adjusting the output of the laser 11', the laser 11' is operated. The laser beam L' emitted from the laser 11' is deflected by the polygonal mirror 12 which is rotated at a high speed in the direction of arrow by the motor 13 and is focused on the surface of the stimulable phosphor sheet 30 by the scanning lens 14 and is caused to scan the surface of the stimulable phosphor sheet 30 at a constant speed in the direction of arrow X while the stimulable phosphor sheet 30 is conveyed in the direction arrow Y. Thus the stimulable phosphor sheet 30 is exposed to the laser beam L' over the entire area thereof.

The portion of the stimulable phosphor sheet 30 exposed to the laser beam L' emits light M' in proportion to the amount of energy stored thereon. The light M' emitted from the exposed parts of the stimulable phosphor sheet 30 enters the optical guide 21 together with a part of the laser beam L'. Since the laser beam L' is cut by the stimulating light cut filter 23, only the light M' passes through the filter 23.

The light M' passing through the filter 23 impinges upon the photomultiplier 22. Since the amount of the stimulating laser beam L' is reduced as described above, the amount of light M' impinging upon the photomultiplier 22 cannot be so large that the photoelectric surface of the photomultiplier 22 is saturated. Accordingly the photomultiplier 22 can photoelectrically convert the amount p' of the light M' to an analog image signal y' without fear that the photoelectric surface thereof being saturated and outputs the analog image signal y' to the logarithmic amplifier 24.

The logarithmic amplifier 24 outputs a logarithmic image signal g' by logarithmic conversion of the analog image signal y'. The logarithmic image signal g' is input into the A/D convertor 25 and is sampled at predetermined sampling intervals in synchronization with the scanning by the laser beam L, thereby quantized into a digital image signal S' made up of image signal components for the respective picture elements.

Thus in the radiation image information read-out system of this embodiment, the phenomenon of saturation of the photoelectric surface can be suppressed and generation of ghost image can be suppressed while ensuring a high sensitivity of the photomultiplier 22.

Though, in the radiation image information read-out systems of the first to third embodiments, the amount of light M' expected to be emitted from the stimulable phosphor sheet upon stimulation thereof is determined by use of the light amount determination means, the radiation image information read-out systems need hot be limited to such an arrangement provided that the amount of light impinging upon the photodetector can be controlled not to saturate the photoelectric surface of the photodetector according to the amount of light to be emitted which may be determined in any manner, e.g., by actually measuring the amount light, by estimation or on the basis of information input from the exterior.

A radiation image information read-out system in accordance with a fourth embodiment of the present invention will be described with reference to FIG. 5, hereinbelow.

Figure 5:
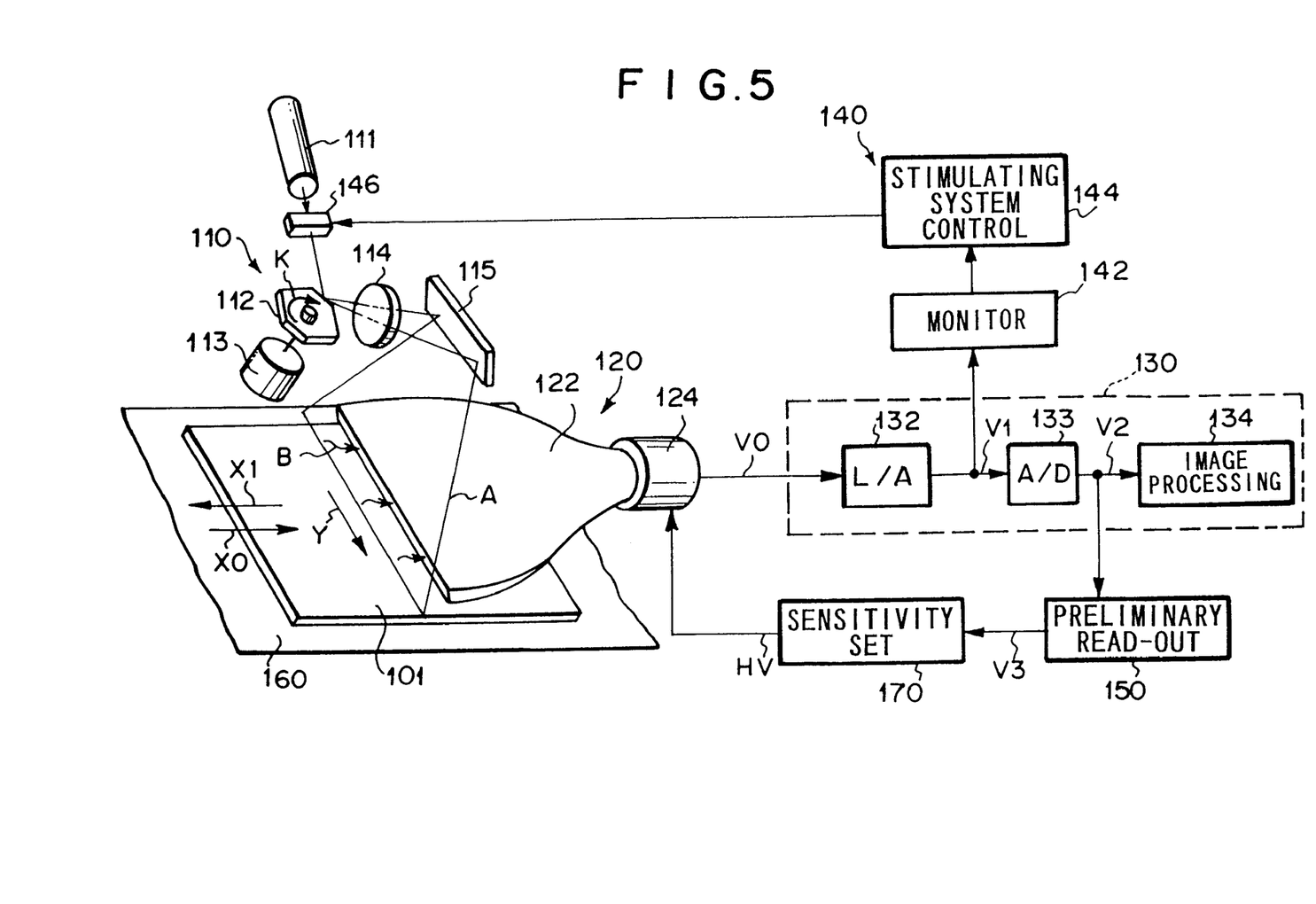
FIG. 5 is a schematic view showing a radiation image information read-out system in accordance with a fourth embodiment of the present invention.

In FIG. 5, the radiation image information read-out system of this embodiment comprises a stimulating light projecting means 110 for scanning a stimulable phosphor sheet 101 with a laser beam A, a photoelectric convertor means 120 which photoelectrically reads light B emitted from the stimulable phosphor sheet 101 upon stimulation by the laser beam A and converts it to an electric signal (an image signal) V0, a signal processing means 130 which carries out a predetermined image processing on the image signal V0, a sensitivity setting means 170 which sets the sensitivity of the photoelectric convertor means 120, an irradiation energy control means 140 which controls the amount of laser beam A (irradiation energy) to which the stimulable phosphor sheet 101 is exposed per unit area thereof, a preliminary read-out means 150 and a conveyor means 160 which conveys back and forth the stimulable phosphor sheet 101 in the directions of arrows X0 and X1 in perpendicular to the direction of arrow Y (to be described later).

The stimulating light projecting means 110 comprises a semiconductor laser pumped solid state laser (SHG) 11 emitting a laser beam A at a predetermined wavelength, a rotating polygonal mirror 112 which deflects the laser beam A, an electric motor 113 which drives the polygonal mirror 112, an fθ lens 114 which condenses the laser beam A and a reflecting optical element 115 which changes the direction of the condensed laser beam A.

The photoelectric convertor means 120 comprises an optical guide 122 which collects light B emitted from the stimulable phosphor sheet 101 upon stimulation by the laser beam A and a photomultiplier 124 which amplifies and converts the light B into an electric signal.

The signal processing means 130 comprises a logarithmic amplifier 132, an A/D convertor 133 and an image processing circuit 134. The image signal output from the photoelectric convertor means 120 is subjected to a predetermined image processing by the signal processing means 130 and then reproduced as a visible image on a display (not shown) or stored in a memory (not shown) for subsequent processing in the form digital image data.

The irradiation energy control means 140 comprises a monitor circuit 142 which watches the output signal V1 of the logarithmic amplifier 132, a stimulating system control circuit 144 and an AOM (acoustooptic modulator) 146 which intensity-modulates the laser beam A emitted from the laser 111.

The operation of the radiation image information read-out system of this embodiment will be described hereinbelow.

The stimulable phosphor sheet 101 on which radiation image information has been recorded by, for instance, a radiation image recording system (not shown) is placed on the conveyor means 160 and conveyed in the direction of arrow X0 to a read-out section formed by the stimulating light projection means 110 and the photoelectric convertor means 120. In the read-out section, the laser beam A emitted from the laser 111 travels through the AOM 146 and is focused on the surface of the stimulable phosphor sheet 101 through the rotating polygonal mirror 112, the fe lens 114 and the reflecting optical element 115. The laser beam A is caused to scan the stimulable phosphor sheet 101 in the direction of arrow Y (main scanning) by virtue of rotation of the polygonal mirror 112 in the direction of arrow K while the stimulable phosphor sheet 101 is conveyed in the sub-scanning direction (the direction of arrow X0 or X1), whereby the stimulable phosphor sheet 101 is two-dimensionally scanned by the laser beam A.

The stimulable phosphor sheet 101 emits light B upon stimulation by the laser beam A and the light B is guided to the photoelectric convertor means 120 by the optical guide 22. The photoelectric convertor means 120 converts the light B into an image signal V0 representing the radiation image information stored on the stimulable phosphor sheet 101.

The method of determining read-out conditions of the radiation image information read-out system in this embodiment will be described hereinbelow. The read-out conditions includes various factors which affect on the relation between the amount of the light B and the output of the radiation image information read-out system, e.g., the read-out sensitivity of the photoelectric convertor means 120 which governs the relation between input and output, the scale factor, and the irradiation energy of the stimulating light. The read-out conditions are determined so that maximum and minimum amounts S1 and S2 of the light B within the range representing the radiation image information respectively correspond to maximum and minimum signal levels Q1 and Q2 within the input signal level range in the signal processing means 130, whereby the maximum and minimum amounts S1 and S2 of the light B are reproduced in a proper density range.

In this embodiment, preliminary read-out is effected prior to final read-out. In the preliminary read-out, the radiation image information stored on the stimulable phosphor sheet 101 is read out by exposing the stimulable phosphor sheet 101 to a laser beam having energy smaller than the laser beam A employed in the final read-out, and the read-out conditions for the final read-out are determined on the basis of the image information obtained by the preliminary read-out through analysis to be described later.

In this particular embodiment, the preliminary read-out is effected in the same manner as the final read-out except that the irradiation energy of the laser beam A is reduced as compared with in the final read-out. That is, the irradiation intensity of the laser beam A to the stimulable phosphor sheet 101 is weakened by intensity-modulating the laser beam A as emitted from the laser 111 by the AOM 146, whereby the irradiation energy of the laser beam A per unit area of the stimulable phosphor sheet 101 is reduced. In this state, the stimulable phosphor sheet 101 is scanned by the laser beam A and light B emitted from the stimulable phosphor sheet 101 is read out by the photoelectric convertor means 120 and the image signal V0 thus obtained is subjected to logarithmic conversion by the logarithmic amplifier 132. Then the logarithmic image signal V1 is converted into a digital image signal V2 by the A/D convertor 133 and the digital image signal V2 is input into the preliminary read-out means 150. The preliminary read-out may be effected by use of a stimulating light projecting means, a conveyor means and the like provided separately from those for the final read-out as disclosed, for instance, in Japanese Unexamined Patent Publication No. 4(1992)-1745. Further as the method for reducing the irradiation energy of the laser beam A per unit area of the stimulable phosphor sheet 101, any method may be employed provided that a brief of the radiation image information stored on the stimulable phosphor sheet 101 can be detected and the read-out conditions can be determined on the basis of the information obtained.

Figure 6:
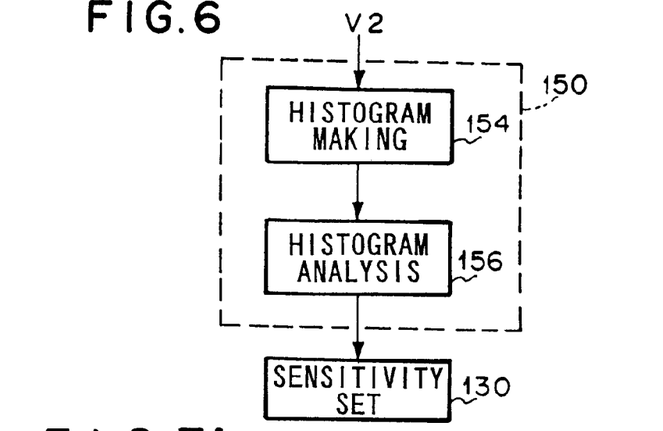
FIG. 6 is a view for illustrating the operation of the preliminary read-out means employed in the radiation image information read-out system in accordance with the fourth embodiment.
Figure 7A:
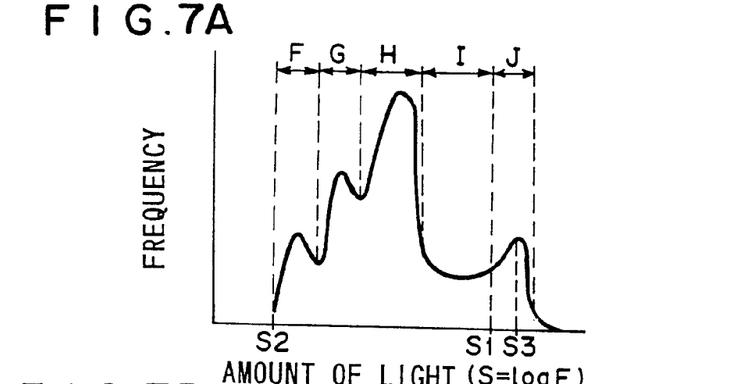
FIGS. 7A and 7B are views showing the relation between the amount of light emitted from the stimulable phosphor sheet and the level of the signal output from the photodetector.
Figure 7B:
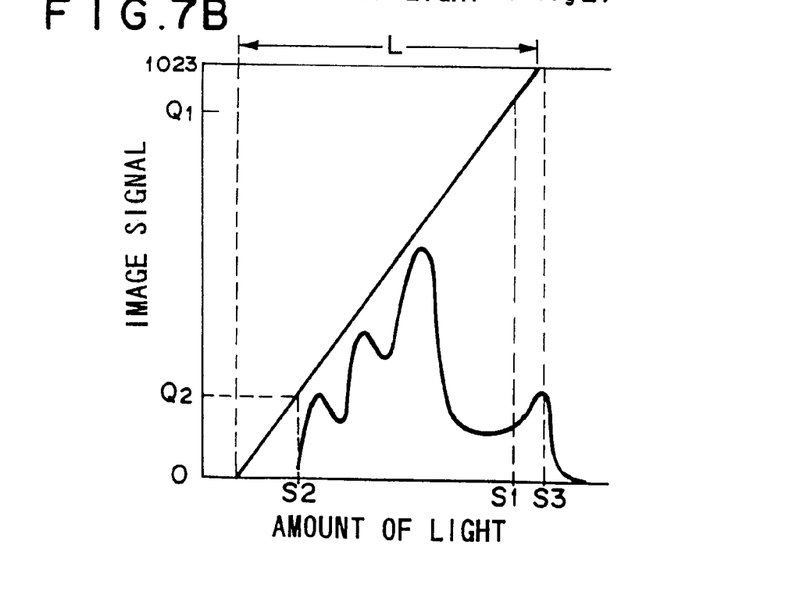

FIG. 6 shows an example of the method for determining, in the preliminary read-out means 150, the read-out conditions (especially the read-out sensitivity) under which the photoelectric convertor means 120 reads out the radiation image information in the final read-out. The image signal V2 obtained by the preliminary read-out is input into a histogram making means 154, which makes a histogram for the levels of the image signal components for the respective picture elements (i.e., a histogram for the amounts of light emitted from the respective spots on the stimulable phosphor sheet 101 exposed to the laser beam A). The histogram made by the histogram making means 154 is input into a histogram analysis means 156 which analyzes the histogram. FIG. 7A shows a pattern of a histogram for a radiation image of the chest. In FIG. 7A, F is the pattern for the mediastinum, G is for the heat, H is for the lung, I is for the skin or a soft part, and J is for the outside of the object (i.e., a blank portion). By such analysis, a brief of the energy stored on the entire stimulable phosphor sheet, e.g., maximum and minimum amount S1 and S2 of light B in a desired image information range (e.g., from the mediastinum to the soft part) can be obtained, and the read-out sensitivity for the photoelectric convertor means 120 can be set on the basis of the maximum and minimum amounts S1 and S2 of light B in the following manner. FIG. 7B shows the histogram shown in FIG. 7A on a graph showing the relation between the amount of light B and the output of the photoelectric convertor means 120. In FIG. 7B, the abscissa represents the amount of light B and the ordinate represents the output of the photoelectric convertor means 120 in digital values (i.e., the output signal V2 of the A/D convertor 33).

Thus the maximum and minimum amounts S1 and S2 of light B in a desired image information range are obtained from a histogram made by the preliminary read-out and the range (Q1 to Q2) of the signal input into the signal processing means 130, that is, the range of the signal output from the photoelectric convertor means 120, is determined corresponding to the values S1 and S2 so that the values S1 and S2 are reproduced properly.

By changing the scale factor represented by the values S1, S2, Q1 and Q2 according to the width of the desired range of the amounts of light B to be emitted from the stimulable phosphor sheet 101 upon stimulation thereof, the width of the range of the signal levels input into the signal processing means 130 can be normally conformed to the width of the desired input signal level range (Q1 to Q2). Thereafter the read-out sensitivity is changed so that the position of the range of the signal levels input into the signal processing means 130 normally conforms to the position of the desired input signal level range.

In this particular embodiment, the image signal V0 read out by the photoelectric convertor means 120 is converted into a logarithmic signal by the logarithmic amplifier 132 and the logarithmic image signal V1 is converted into the digital signal V2 having components ranging over 10 bits (digital values of 0 to 1023). Then the read-out sensitivity is set so that the range (S1 to S2) of the amount of light B emitted from the stimulable phosphor sheet 101 conforms to the 10-bit digital signal V2 and the amount of light (S3 in FIG. 7B) emitted from a blank portion of the radiation image information stored on the stimulable phosphor sheet 101 (e.g., the portion denoted by J in FIG. 7A) becomes larger than the amount corresponding to the upper limit of the operable range L of the photoelectric convertor means 120 (in this particular embodiment, the range of the amounts of light B resulting in digital values of 0 to 1023). The read-out sensitivity can be adjusted by changing the highest voltage HV of the photoelectric convertor means 120. Then a control signal V3 is obtained in the manner described above on the basis of histogram analysis and the control signal V3 is input into the sensitivity setting means 170, which sets the read-out sensitivity of the photoelectric convertor means 120 by changing the highest voltage HV imparted to the photoelectric convertor means 120 on the basis of the control signal V3.

The intensity (irradiation energy) P0 of the laser beam A when scanning the image area other than the blank portion in the final read-out (will be referred to as "the steady state", hereinbelow) may be obtained in advance in the preliminary read-out.

A method of controlling the intensity of the laser beam A to the stimulable phosphor sheet 101 in the final read-out will be described with reference to FIGS. 8A to 8E. After the read-out sensitivity is set in the manner described above, the conveyor means 60 is reversed to return (in the direction of arrow X1 in FIG. 5) the stimulable phosphor sheet 101 to the original position (the position before the preliminary read-out). The intensity of the laser beam B is first set to the intensity P0 in the steady state in the final read-out. The intensity P0 may be obtained through analysis of the histogram obtained by the preliminary read-out, or may be set to a predetermined value corresponding to the radiographing menu. In this state, the radiation image information stored on the stimulable phosphor sheet 101 is read out by the photoelectric convertor means 120 while scanning the stimulable phosphor sheet 101 with the laser beam A.

Figure 8A:
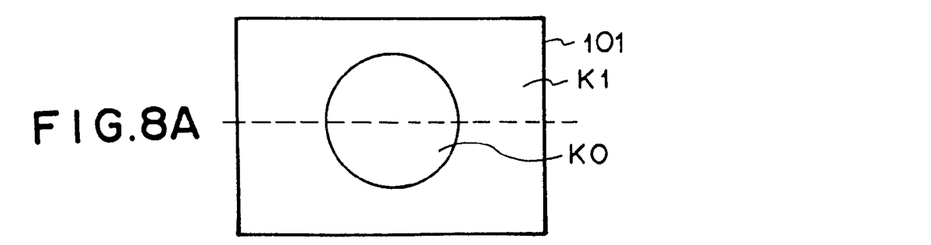
FIGS. 8A to 8E are views for illustrating the method of controlling the energy of the stimulating light.
Figure 8B:
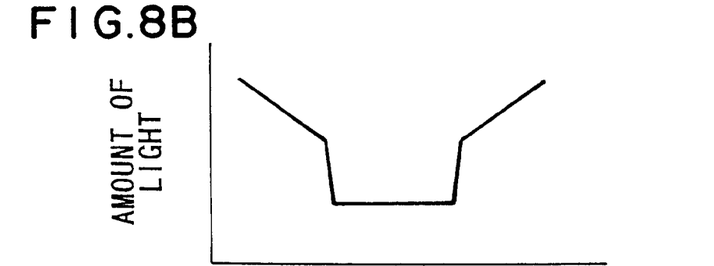
Figure 8C:
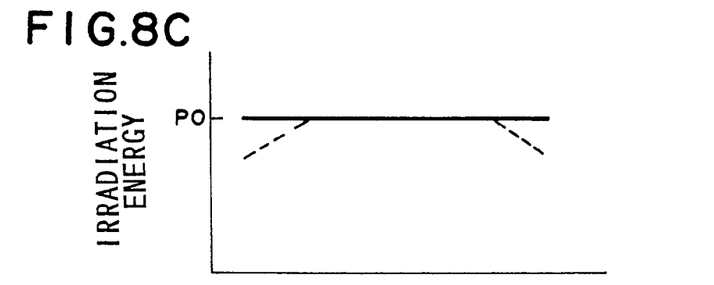
Figure 8D:
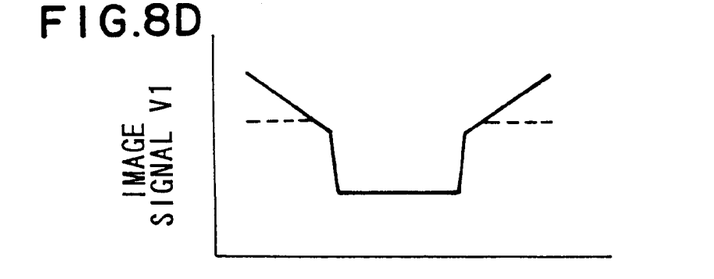
Figure 8E:
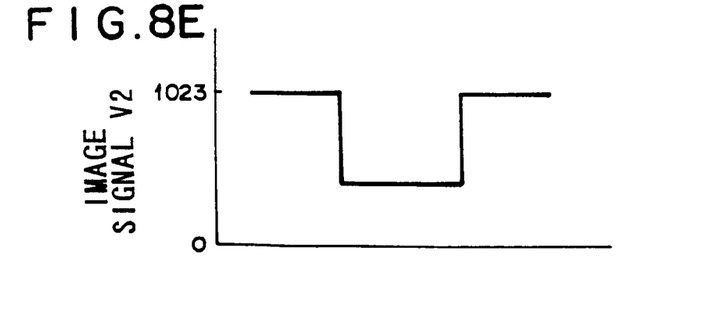

FIG. 8A schematically shows a radiation image K0 of an object stored on a stimulable phosphor sheet 101. K1 denotes a blank portion. FIG. 8B shows change in the amount of light B emitted from the stimulable phosphor sheet 101 when the laser beam A scans the stimulable phosphor sheet 101 along the dashed line in FIG. 8A. FIG. 8C shows change in the irradiation dose or the irradiation energy of the laser beam A to which the stimulable phosphor sheet 101 is exposed per unit area thereof. FIG. 8D shows change in the image signal read out by the photoelectric convertor means 120 (in this embodiment, the output V1 of the logarithmic amplifier 132). FIG. 8E shows change in the digital image signal V2 obtained by digitizing the image signal V1 by the A/D convertor 133. The solid lines in FIGS. 8C and 8D show the corresponding properties when the control of the stimulating light in accordance with the present invention is not performed.

The output signal V1 of the logarithmic amplifier 132 is watched by the monitor circuit 142, and the stimulating system control circuit 144 controls the AOM 146 to reduce the amount of the laser beam A on the basis of the output of the monitor circuit 142 so that the output signal level V1 of the logarithmic amplifier 132 when the photoelectric convertor means 120 detects the light B emitted from the blank portion K1 is minimized in the range higher than the upper limit of the read-out signal level range of the photoelectric convertor means 120. By changing the amount of the laser beam A passing through the AOM 146, the irradiation dose to which the stimulable phosphor sheet 101 is exposed per unit area thereof, that is, the stimulating energy of the laser beam A can be reduced. Since the amount of light emitted from the stimulable phosphor sheet 101 upon stimulation by the stimulating light depends upon the energy of the stimulating light (the laser beam A) per unit area of the stimulable phosphor sheet 101 as described above, the amount of light emitted from the blank portion K1 can be reduced by reducing the amount of the laser beam A passing through the AOM 146 when that the laser beam A is scanning the blank portion K1 is detected through the level of the image signal V1 by the stimulating system control circuit 144. When such scanning is repeated, the amount of light emitted from the blank portion K1 is rapidly reduced. Since the amount of afterglow becomes smaller as the amount of light emitted from the stimulable phosphor sheet 101 upon stimulation thereof becomes smaller as described above, the aforesaid problems caused by the afterglow can be overcome and the radiation image information can be accurately read out at a high speed. Further since generation of afterglow itself is prevented by reducing the stimulating light, the S/N ratio can be improved. The change in the irradiation energy of the laser beam A to which the stimulable phosphor sheet 101 is exposed per unit area thereof and the change in the image signal read out by the photoelectric convertor means 120 are shown by the dashed line respectively in FIGS. 8C and 8D.

In the portion K0 other than the blank portion, the irradiation energy of the laser beam A is kept at the value P0 in the steady state, whereby the image signal V1 can be at a signal level suitable for image information required in diagnosis and the radiation image information can be reproduced as a visible image at proper gradation.

In the above description, the irradiation energy of the laser beam A to which the stimulable phosphor sheet 101 is exposed per unit area thereof is reduced by the AOM 146, the irradiation energy may be controlled in various manners. For example, a visible region semiconductor laser is employed as the laser 111 and the intensity of the visible laser beam may be directly intensity-modulated. Further the irradiation energy may be controlled by changing the scanning speed of the laser beam A relative to the stimulable phosphor sheet 101, e.g., by changing the conveying speed by the conveyor means 160 or the scanning speed of the laser beam A.

Further though in the above description, the read-out sensitivity of the photoelectric convertor means 120 is set on the basis of the information obtained by the preliminary read-out, the preliminary read-out need not be effected. For example, since a desired read-out sensitivity can be determined in advance according to the radiographing menu, e.g., whether the object is the chest or the heart, a plurality of levels of the read-out sensitivity of the photoelectric convertor means 120 in relation to different radiographing menus and the read-out sensitivity of the photoelectric convertor means 120 may be set to the sensitivity level corresponding to the radiographing menu for the radiation image information to be read out.

When erasing residual energy on the stimulable phosphor sheet after completion of read-out, energy for erasure is sometimes calculated by carrying out a predetermined signal processing on the read-out signal level. In such a case, there is a fear that a correct erasing energy level cannot be obtained when the conventional method of calculation is applied as it is to the stimulable phosphor sheet which has been read out by the method of the present invention since the signal level for the blank portion is lowered. On the other hand, since in accordance with the present invention, the light B emitted from the blank portion K1 is minimized in the range higher than the upper limit of the read-out signal level range of the photoelectric convertor means 120, the problem that the read-out signal level for the blank portion exceeds the range where the characteristics of the photoelectric convertor means is linear, which makes it impossible to realize a correct signal level, can be avoided. Accordingly, by taking into account information on the reduction of the stimulating light during read-out, erasing energy can be more accurately calculated.

What is claimed is:

1. A radiation image information read-out method for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises the step of changing the amount of the stimulating light impinging upon the stimulable phosphor sheet continuously according to the amount of light emitted from the stimulable phosphor sheet upon stimulation thereof so that the photoelectric surface is not saturated by an excessive amount of light impinging thereupon.

2. A radiation image information read-out method as defined in claim 1 in which the amount of light emitted from the stimulable phosphor sheet upon stimulation thereof is determined according to the radiographing menu when the radiation image information on the object was recorded on the stimulable phosphor sheet.

3. The radiation image information read-out method according to claim 2, wherein the radiographing menu is provided by user input.

4. The radiation image information read-out method according to claim 2, wherein the radiographing menu is read from a code recorded on the stimulable phosphor sheet.

5. A radiation image information read-out system for obtaining an image signal representing radiation image information on an object stored on a stimulable phosphor sheet by scanning the stimulable phosphor sheet with a stimulating light beam and photoelectrically detecting light emitted from the stimulable phosphor sheet upon stimulation thereof by a photodetector having a photoelectric surface, wherein the improvement comprises a means for changing the amount of the stimulating light impinging upon the stimulable phosphor sheet continuously according to the amount of light emitted from the stimulable phosphor sheet upon stimulation thereof so that the photoelectric surface is not saturated by an excessive amount of light impinging thereupon.

6. A radiation image information read-out system as defined in claim 5 in which the amount of light emitted from the stimulable phosphor sheet upon stimulation thereof is determined according to the radiographing menu when the radiation image information on the object was recorded on the stimulable phosphor sheet.

7. The system of claim 5, further comprising a light amount estimating device for estimating the amount of light emitted from the stimulable phosphor according to a radiographing menu and the amount of stimulating light output by a light source.

8. The system of claim 7, further comprising a reader for reading the radiographing menu from the stimulable phosphor sheet.

9. The system of claim 7, wherein the radiographing menu comprises at least one of: a material of the object being imaged; a size of the object being imaged; and a direction of radiographing.

10. The system of claim 9, further comprising a reader reading the radiographing menu from the stimulable phosphor sheet.

11. The system of claim 5, wherein the means for changing the amount of the stimulating light comprises a speed controller to control a rate of scanning the stimulating light relative to the stimulable phosphor sheet based on an amount of light emitted from the stimulable phosphor sheet.

12. The system of claim 11, wherein the speed controller controls a speed of conveyance of the stimulable phosphor sheet.

* * * * *